(12) United States Patent
Hozuki et al.

(10) Patent No.: US 9,774,286 B2
(45) Date of Patent: Sep. 26, 2017

(54) MOTOR CONTROL DEVICE

(71) Applicant: Mitsubishi Electric Corporation, Chiyoda-ku (JP)

(72) Inventors: Takashi Hozuki, Chiyoda-ku (JP); Hisanori Yamasaki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 140 days.

(21) Appl. No.: 14/890,455

(22) PCT Filed: Jul. 2, 2013

(86) PCT No.: PCT/JP2013/068102
§ 371 (c)(1),
(2) Date: Nov. 11, 2015

(87) PCT Pub. No.: WO2015/001612
PCT Pub. Date: Jan. 8, 2015

(65) Prior Publication Data
US 2016/0111991 A1   Apr. 21, 2016

(51) Int. Cl.
*H02P 21/00* (2016.01)
*H02P 6/00* (2016.01)
(Continued)

(52) U.S. Cl.
CPC ............ *H02P 21/0003* (2013.01); *H02P 6/10* (2013.01); *H02P 21/14* (2013.01); *H02P 21/18* (2016.02)

(58) Field of Classification Search
CPC .......... H02P 21/00; H02P 21/14; H02P 27/06; H02P 6/00; H02P 6/10
See application file for complete search history.

(56) References Cited

U.S. PATENT DOCUMENTS 6,462,491 B1 * 10/2002 Iijima ................... H02P 9/18
                                                                318/400.09
9,362,840 B2 *  6/2016 Kato ..................... H02M 7/487
(Continued)

FOREIGN PATENT DOCUMENTS

CN        102710188 A    10/2012
JP        11-015532 A     1/1999
(Continued)

OTHER PUBLICATIONS

International Search Report Issued Sep. 17, 2013, in PCT/JP13/68102 Filed Jul. 2, 2013.
(Continued)

*Primary Examiner* — Bentsu Ro
*Assistant Examiner* — Said Bouziane
(74) *Attorney, Agent, or Firm* — Oblon, McClelland, Maier & Neustadt, L.L.P.

(57) ABSTRACT

A motor control device includes an electric power converter for generating three-phase voltages based on voltage instruction-values, and for supplying them to a motor; an induced-voltage estimation unit for estimating an induced voltage of the motor, based on the voltage instruction-values and electric current feedback values; a dead-time disturbance-voltage compensation unit; and a dead-time disturbance compensation-voltage modification unit for compensating a dead-time disturbance voltage(s) generated in the electric power converter, based on a fundamental wave component of an estimated induced voltage.

8 Claims, 6 Drawing Sheets

(51) Int. Cl.
*H02P 6/10* (2006.01)
*H02P 21/14* (2016.01)
*H02P 21/18* (2016.01)

(56) References Cited

U.S. PATENT DOCUMENTS

| | | | |
|---|---|---|---|
| 2007/0176575 A1* | 8/2007 | Nawa | H02M 7/53875 318/800 |
| 2011/0175556 A1 | 7/2011 | Tobari et al. | |
| 2012/0206077 A1* | 8/2012 | Yoneshima | H02P 6/185 318/400.33 |
| 2013/0221885 A1* | 8/2013 | Hunter | H02P 21/0003 318/400.15 |
| 2014/0156144 A1* | 6/2014 | Hoshi | B62D 5/0463 701/41 |

FOREIGN PATENT DOCUMENTS

| | | |
|---|---|---|
| JP | 2004-064948 A | 2/2004 |
| JP | 2010-200395 A | 9/2010 |
| JP | 2011-151883 A | 8/2011 |
| JP | 2012-044785 A | 3/2012 |

OTHER PUBLICATIONS

Office Action issued Mar. 20, 2017 in Chinese Patent Application No. 201380077860.9 (with English translation).
International Search Report dated Sep. 17, 2013, in PCT/JP13/68102 Filed Jul. 2, 2013.
Sugimoto, et al., "Actualities of Theory and Design of AC Servo Systems," Sogo Denshi Shuppan, 1990, pp. 54-57 and pp. 72-85.

* cited by examiner

MOTOR CONTROL DEVICE

BACKGROUND OF THE INVENTION

Field of the Invention

The present invention relates to a motor control device for driving a motor (rotating machine) by an electric power converter which outputs desired electric power by means of repetitions of a turn-on operation and a turn-off operation in two arms constituted of switching devices, and more particularly to a motor control device using an electric power converter for driving switching devices utilizing a pulse width modulation (Pulse-Width Modulation, hereinafter referred to as a "PWM," for brevity).

Description of the Related Art

In the field of a motor (the same as a rotating machine, hereinafter in a similar fashion) control, development of technologies is in progress in estimating mechanical state-values such as a position and speed of the motor, and torque thereof or the like from electrical state-values of electric voltages, currents and the like. In these technical areas, it is important as a matter of course to accurately acquire the electrical state-values of electric voltages, currents and the like having been the source without being influenced by the disturbance.

In particular, as disturbance which exerts bad influence on voltage acquisition, a dead-time disturbance voltage generated by an electric power converter can be named. In what follows, the explanation will be made for the dead-time disturbance voltage.

In the electric power converter, power device elements of two arms constituting of an electric power conversion means provided in an output stage perform switching operations based on voltage instructions to generate alternating-current voltages, which are outputted into an alternating-current load(s); as an object to prevent short-circuiting breakdown due to simultaneous conduction of the power device elements of two arms, a period is set in which the power device elements of two arms are controlled to be put in turn-off operation states at the same time. This period is referred to as "dead time"; due to the dead time, an error occurs between a voltage instruction in which the electric power conversion means receives, and a voltage in which the electric power conversion means actually outputs to a load based on the voltage instruction.

Figure 1:
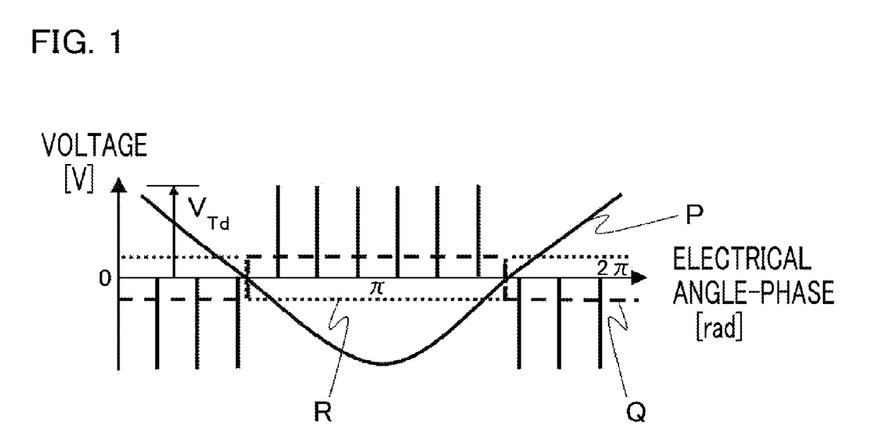
FIG. 1 is a diagram for explaining a general outline of dead-time disturbance voltages.

It is known that error voltages originating in the dead time are determined from a dead-time period Td, a carrier frequency fc and a direct-current voltage Vdc, and take such waveforms shown by the solid lines in FIG. 1.

To be specific, voltage in the shape of pulses each having a slight area of Td×Vdc is synchronized with each of the polarities of a three-phase output current [i] (a set of symbols [ ] designates that the quantity in the square brackets is a vector, hereinafter in a similar fashion), and is such a disturbance voltage where the pulses rise for a number of fc times per half a period of the [i].

From the solid-line waveforms in FIG. 1, it can be understood that, as expressed by the following Equation (1) when consideration is given to a time average, these dead-time disturbance voltages have a reversed polarity to an individual polarity of the three-phase output current [i] from an electric power conversion means, and are equivalent to a voltage in the shape of a three-phase rectangular wave such that the amplitude is $V_{Td}=Td \times fc \times Vdc$.

$$[v_{Td}] = -\text{sgn}[i] \times V_{Td} \quad (1)$$

When Equation (1) is depicted, which results in such a waveform of the broken line (indicated by the symbol "Q") in FIG. 1.

As it is clear from the waveform, it can be said that the dead-time disturbance voltages has rises or descents for six times per one period at motor's electrical angle in a sum total of three phases, and that disturbance vibrating with six-times order component at motor's electrical angle (hereinafter referred to as a "6f-component") occurs with respect to torque in which the motor produces (hereinafter referred to as a "torque ripple"). Note that, the disturbance vibrating with six-times order component at motor's electrical angle is hereinafter referred to as as a "6f torque ripple." Note also that, the solid-line curve indicated by the symbol "P" in the shape of a sinusoidal wave (sine wave) in FIG. 1 shows a phase-U current waveform.

When Equation (1) is based on, a negative-phase-sequence voltage as indicated in Equation (2) (namely, a voltage in the shape of a three-phase rectangular wave having the same polarity with the phase current, and the amplitude being $V_{Td}$) is added in advance, in comparison with Equation (1), to each phase of voltage instructions to be inputted into the electric power converter, so that it becomes possible to compensate a disturbance voltage(s) originating in the dead time.

$$[v_{Td}] = \text{sgn}[i] \times V_{Td} \quad (2)$$

When Equation (2) is depicted, it takes such a waveform as the dotted line in FIG. 1 (indicated by the symbol "R").

The technologies described above are publicly known technologies relating to generation of the dead-time disturbance voltages and their compensation (for example, refer to Sugimoto, Koyama, and Tamai [Authors], "Actualities of Theory and Design of AC Servo Systems," 1990, pp. 54-57 and pp. 72-85, [then] Sogo Denshi Shuppan-sha, Tokyo).

However, in power device elements inside the electric power converter, there exist error factors such as response delays of a turn-on operation and a turn-off operation, and ON-voltage drops of the power device elements and diodes; and thus, it can be said that an error occurs between a dead-time period Td being set on a controller, and a dead-time period actually produced inside the electric power converter.

If it is possible to accurately measure error times such as these response delays of a turn-on operation and a turn-off operation, and ON-voltage drops of the power device elements and the diodes, it can be said that modification for those quantities is suitable to be performed; however, it is actually difficult to accurately measure those error times. For dealing therewith, as one of the methods to cope with delays occurring in these actual device elements, a technology is proposed in which a dead-time disturbance voltage is appropriately estimated, and a dead-time disturbance compensation-voltage is generated (for example, refer to Japanese Laid-Open Patent Publication No. 2004-64948).

In such a technology, it is possible to estimate a dead-time disturbance voltage associated with delays in the device elements based on observations of only electrical state-values; from the viewpoints of easiness and convenience, the technology is useful in estimating the dead-time disturbance voltage.

RELATED ART DOCUMENTS

Non-Patent Documents

[Non-Patent Document 1] Sugimoto, Koyama, and Tamai, "Actualities of Theory and Design of AC Servo Systems," 1990, pp. 54-57 and pp. 72-85, Sogo Denshi Shuppansha, Tokyo

Patent Document

[Patent Document 1] Japanese Laid-Open Patent Publication No. 2004-64948

SUMMARY OF THE INVENTION

Problems to be Solved by the Invention

However, in particular, there arises a problem in that, when the processing for estimating such disturbance contained in the electrical state-values is to be added to a control device including the processing for estimating a mechanical state-value from the electrical state-values described above, suitable operations are impaired because of the mutual interference.

In particular, when torque is subjected to the estimation as a mechanical state-value, it is known that a 6f torque ripple is not only produced due to a dead-time disturbance voltage (s), the motor itself also produces a 6f torque ripple, so that both of the parties become the signals of the same period. Therefore, estimation calculations of the two different physical quantities on the same frequency result in overlapping with each other; it becomes difficult to draw a distinction therebetween.

The present invention has been directed at solving these problems described above, and the invention allows performing estimation calculation of a mechanical state-value while holding easiness and convenience of a dead-time disturbance-voltage compensation technology based on estimation calculation from electrical state-values.

Means for Solving the Problems

A motor control device according to the present invention comprises:

a rotational position detector for detecting a rotational position of a motor;

an electric current detection unit for detecting at least two phase currents among three phase currents applied to the motor;

a coordinate conversion unit for mutually converting values of said three phase currents on predetermined coordinates, and values on d-q coordinates being coordinates on a rotating magnetic field of the motor;

an electric current control unit for generating voltage instruction-values being control inputs of voltages, based on a difference between electric current instruction-values being control inputs for said three phase currents, and electric current feedback values being currents detected by the electric current detection unit and d-q coordinate-converted by the coordinate conversion unit;

an electric power converter for generating, based on said voltage instruction-values, three-phase voltages being inputted through the electric current detection unit so that predetermined electric power is supplied to the motor;

an induced-voltage estimation unit for estimating, based on said voltage instruction-values and said electric current feedback values, an induced voltage of the motor;

a dead-time disturbance-voltage compensation unit for generating a dead-time disturbance compensation-voltage being a voltage to compensate disturbance, with respect to an output produced at the electric current detection unit, due to dead time which is a short-circuit prevention period of two switching devices provided in the electric power converter; and a dead-time disturbance compensation-voltage modification unit for modifying said dead-time disturbance compensation-voltage in accordance with said electric current instruction-values, and also having the induced-voltage estimation unit, and, based on a fundamental wave component of an induced voltage being estimated, a dead-time disturbance compensation-voltage memory unit for calculating an error of said dead-time disturbance compensation-voltage and for storing the error inside, wherein the motor control device comprises two operation modes of a dead-time disturbance compensation-voltage adjustment mode for setting said electric current instruction-values in accordance with an operation pattern of the motor in order to acquire said dead-time disturbance compensation-voltage, and a torque-ripple suppression control mode for estimating torque of the motor, and for curbing a torque ripple thereof based on the torque being estimated; and, after operations in the dead-time disturbance compensation-voltage adjustment mode are completed, the operations transfer to the torque-ripple suppression control mode.

Effects of the Invention

Based on observations of electrical state-values, the dead-time disturbance compensation can be easily performed, and there exists an effect in addition that, based on the observations of electrical state-values, two operations of the dead-time disturbance compensation and the mechanical state-value estimation can be executed without interfering with each other.

BRIEF DESCRIPTION OF DRAWINGS

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereunder, preferred embodiments according to the present invention will be described in detail with reference to the accompanying drawings.

Embodiment 1

Figure 2:
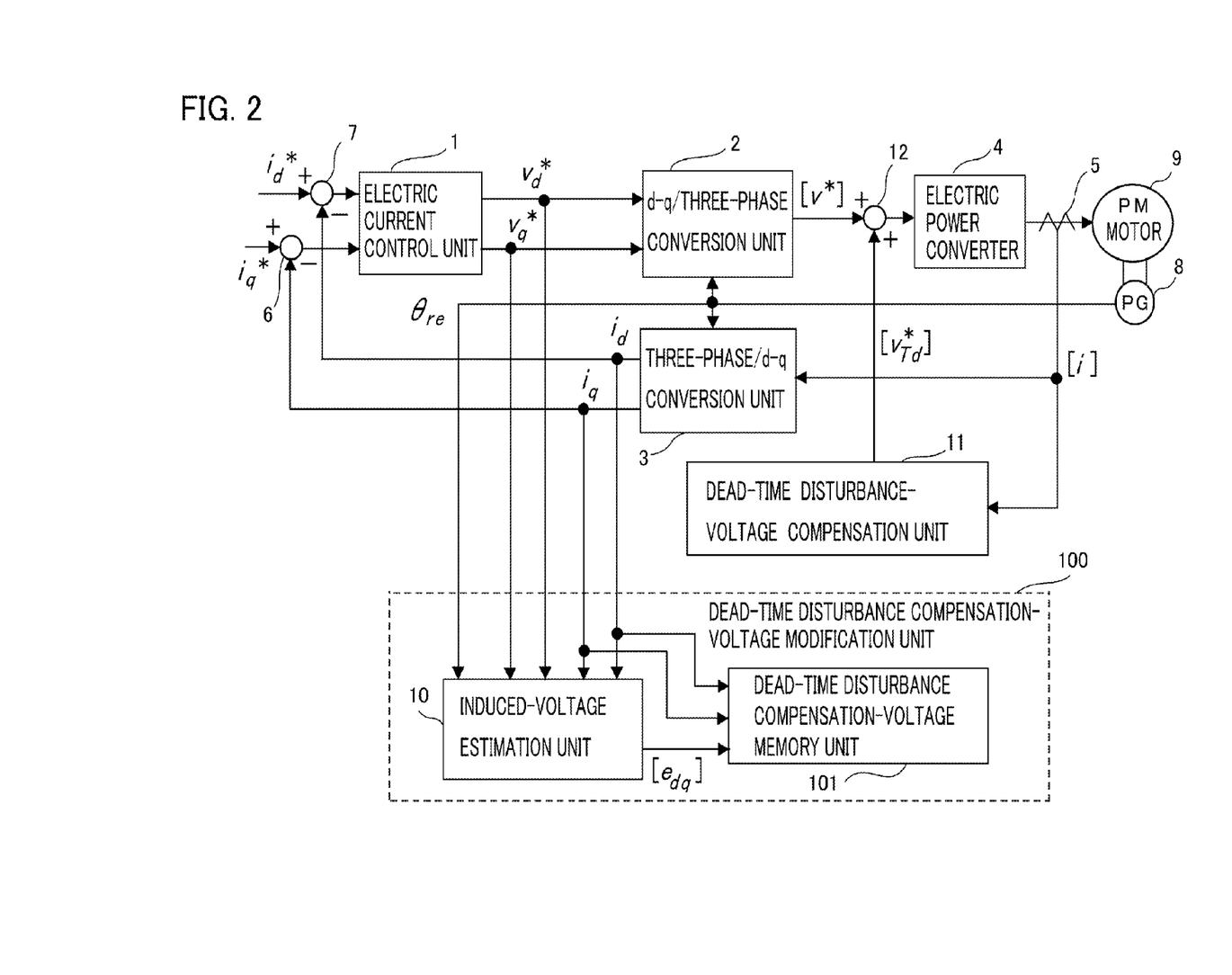
FIG. 2 is a block diagram illustrating an example of a configuration of a first operation mode according to a motor control device of the present invention.
Figure 3:
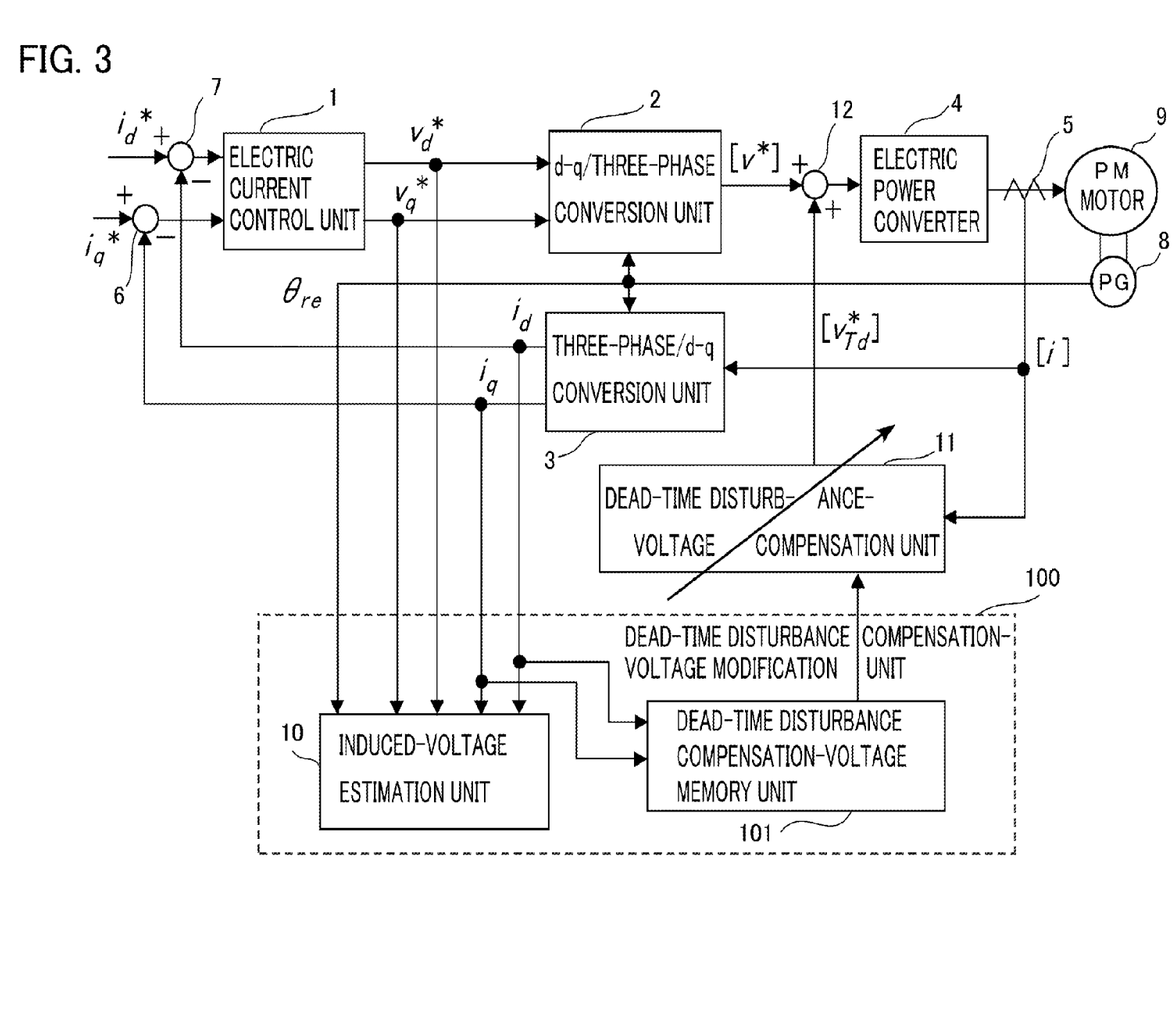
FIG. 3 is a block diagram illustrating another example of a configuration of a first operation mode according to a motor control device of the present invention.
Figure 4:
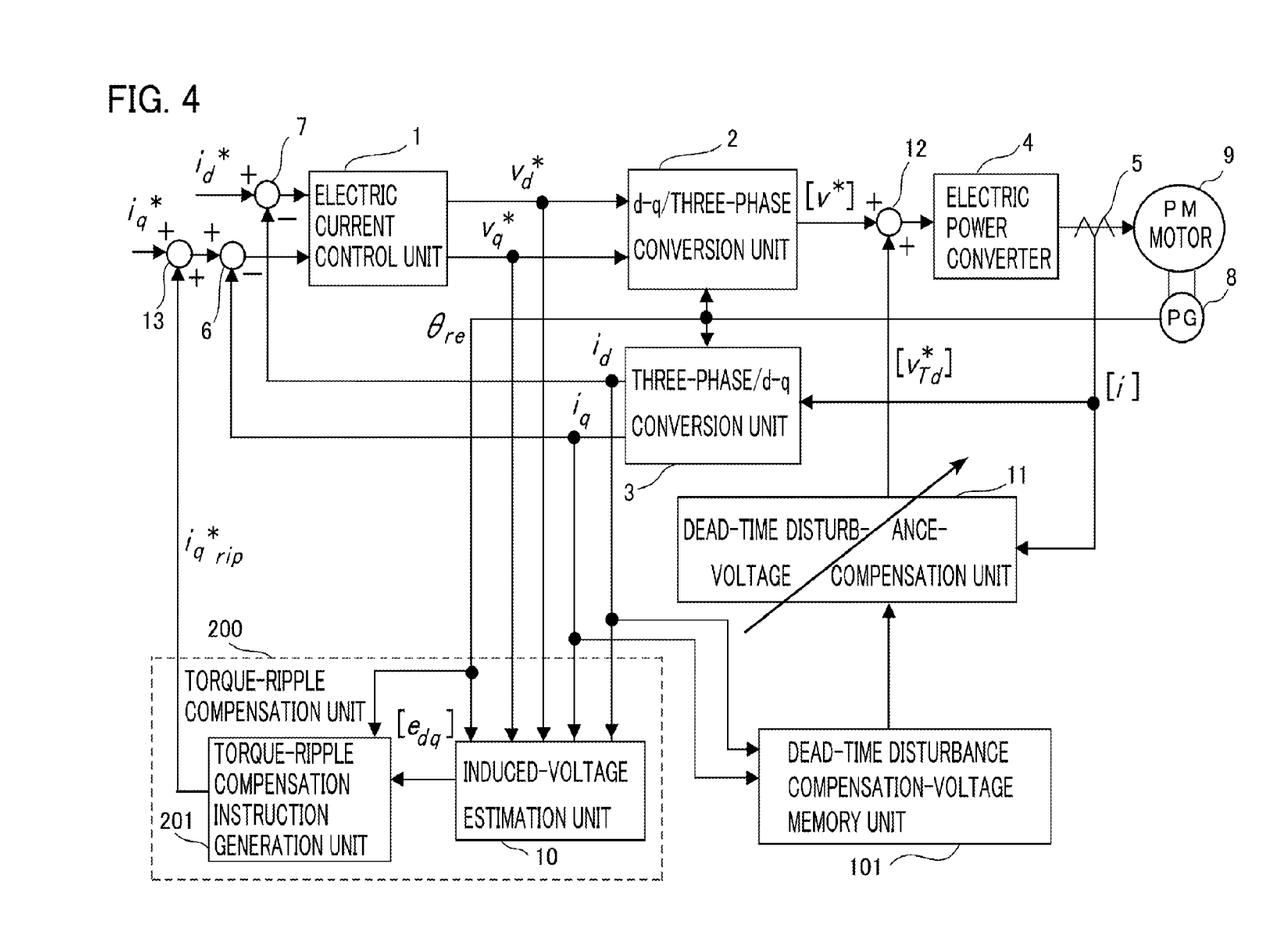
FIG. 4 is a block diagram illustrating an example of a configuration of a second operation mode according to a motor control device of the present invention.

FIG. 2, FIG. 3 and FIG. 4 are block diagrams each illustrating an example of Embodiment 1 according to the present invention. This embodiment includes two operation modes: a dead-time disturbance compensation-voltage adjustment mode illustrated in FIG. 2 and FIG. 3 as a first operation mode, and a mechanical state-value estimation mode illustrated in FIG. 4 as a second operation mode. And then, a sequence is included in which, first the operations are performed as a dead-time disturbance compensation-voltage adjustment mode, and subsequently, the operations transfer to the mechanical state-value estimation mode.

As the mechanical state-value estimation mode, the exemplary explanation will be made for a device which includes a torque-ripple suppression control mode in which motor's torque is estimated, and a torque ripple is curbed based on the estimated torque.

In FIG. 2 and FIG. 3, the motor control device has an electric current control unit 1, a d-q/three-phase conversion unit 2, a three-phase/d-q conversion unit 3, an electric power converter 4, an electric current detection unit 5, subtracters 6 and 7, a rotational position detector 8, and a dead-time disturbance compensation-voltage modification unit 100. And then, the motor control device controls a PM motor (hereinafter simply referred to as a "motor") 9 as an alternating-current rotating machine by means of the electric power converter 4.

In addition, into a dead-time disturbance-voltage compensation unit 11, a three-phase output current [i] detected by means of the electric current detection unit 5 is inputted, so that, based on the three-phase output current [i], a dead-time disturbance compensation-voltage $[v^*_{Td}]$ of a three-phase rectangular wave expressed by Equation (2) is generated and outputted, being inputted into an adder 12.

In this embodiment, a motor's torque control device (which can be, in other words, referred to as an electric current control device in this embodiment) is constituted of the electric current control unit 1, the d-q/three-phase conversion unit 2, the three-phase/d-q conversion unit 3, the electric power converter 4, the electric current detection unit 5, the subtracter 6 and 7, the rotational position detector 8, the motor 9, the dead-time disturbance-voltage compensation unit 11 and the adder 12; from these constituent items, a torque control (which can be, in other words, referred to as an electric current control in this embodiment) is performed based on respective difference between a q-axis electric current instruction-value $i_q^*$ and a q-axis electric current detected-value $i_q$, and that between a d-axis electric current instruction-value $i_d^*$ and a d-axis electric current detected-value $i_d$; and thus, the motor 9 is driven so that the electric currents equal to the $i_q^*$ and $i_d^*$ flow through the motor, which produces its torque equal to a torque instruction-value τ* (for the details of the operations of torque control, or those of electric current control, refer to Sugimoto, Koyama, and Tamai [Authors], "Actualities of Theory and Design of AC Servo Systems," 1990, pp. 54-57 and pp. 72-85, [then] Sogo Denshi Shuppan-sha, Tokyo, for example).

Moreover, the relationship between the torque instruction-value τ* and the q-axis electric current instruction-value $i_q^*$ is given as the following Equation (3).

$$\tau^* = \frac{i_q^*}{K_t} = \frac{i_q^*}{P_m \phi_f} \tag{3}$$

where $K_t$ designates a torque constant of the motor; $P_m$, the number of pole pairs; and $\phi_f$, magnet's magnetic flux.

First, the explanation will be made for the operations of the dead-time disturbance compensation-voltage adjustment mode that is a first operation mode. In the motor control device of the present invention, an operation pattern for acquiring dead-time disturbance compensation-voltage is set to have three features (a), (b) and (c), as follows:
(a) To the motor 9, its speed is given not at 0, but at a predetermined rotational velocity $\omega_{td}$ or more, so that it is rotating;
(b) the q-axis electric current instruction-value $i_q^*$ is set at 0; and
(c) a plurality of values are set as d-axis electric current instruction-values $i_d^*$, and, in each of $i_d^*$, the operations of this operation mode are performed through repetition thereof. In this operation mode, each of the instruction values is set in accordance with the operation pattern for acquiring dead-time disturbance compensation-voltage, so that the motor 9 is subjected to be driven. In these cases, the explanation will be made for the operations of the dead-time disturbance compensation-voltage modification unit 100.

In an induced-voltage estimation unit 10, an induced-voltage estimate value vector $[e_{dq}]$ as a motor's estimated induced voltage is estimated according to the calculation of the following Equation (4), based on a motor constant, a vector $[i_{dq}]$ made of a d-axis electric current detected-value $i_d$ and a q-axis electric current detected-value $i_q$, a vector $[v^*_{dq}]$ made of voltage instruction-values $v_d^*$ and $v_q^*$ to the motor 9, and a motor's electrical angle $\theta_{re}$ detected by the rotational position detector 8 such as an encoder or the like.

$$\left. \begin{array}{l} \frac{d\theta_{re}}{dt} = \omega_{re} = P_m \omega_{rm} \\ [e_{dq}] = [v^*_{dq}] - \{(R + sL)I + \omega_{re}LJ\}[i_{dq}] \end{array} \right\} \tag{4}$$

Here, symbol R designates resistance of motor's winding; L, self inductance thereof; $P_m$, the number of pole pairs; s, differential operator; I, unit matrix; J, skew symmetric matrix; $\omega_{rm}$, mechanical angular velocity; and $\omega_{re}$, electrical angular velocity.

And then, the induced-voltage estimate value vector $[e_{dq}]$ is inputted into a dead-time disturbance compensation-voltage memory unit 101. Next, the explanation will be made for the operations of the dead-time disturbance compensation-voltage memory unit 101. As for a fundamental wave component $e_d$ bar of a d-axis induced-voltage estimate value $e_d$ in the induced-voltage estimate value vector $[e_{dq}]$ a dead-time disturbance compensation-voltage amplitude error $\Delta V_{Td}$ is given according to the calculation of the following Equation (5).

$$\Delta V_{Td} = \frac{e_{d\_\text{bar}}}{2\sqrt{\frac{2}{3}}\sin\left(\frac{5\pi}{12}\right)} \quad (5)$$

Figure 5:
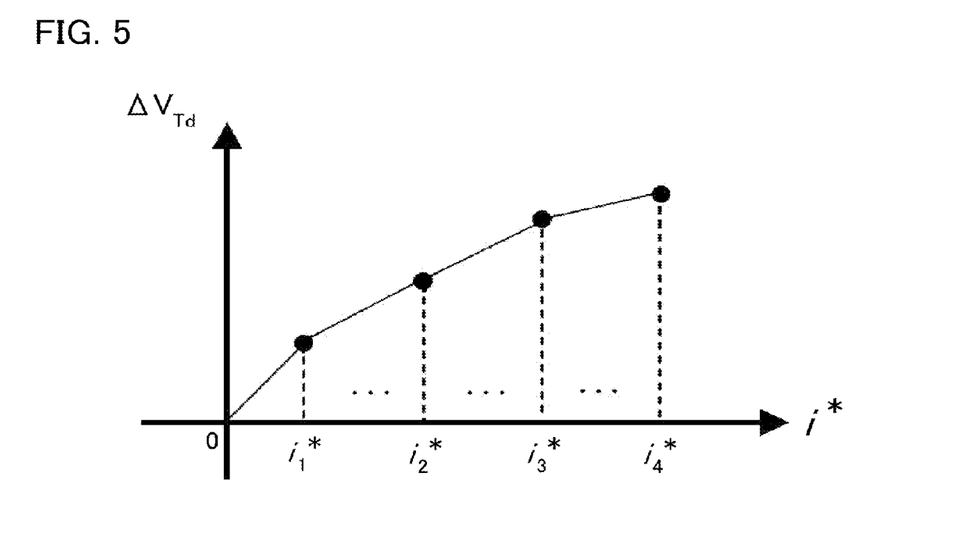
FIG. 5 is a diagram showing an example of a map of dead-time disturbance compensation-voltage amplitude errors stored in a memory means in a first operation mode according to a motor control device of the present invention.

The operations described above are repeated in each of the cases for a plurality of $i_d^*$. And then, by using an arbitrary approximation method of a linear interpolation, for example, or the like, a map of $\Delta V_{Td}$ is made with respect to a motor's electric current amplitude instruction-value $i^*$ made of $i_d^*$ and $i_q^*$ (refer to Equation (6) below) as shown in FIG. 5, and is stored in the dead-time disturbance compensation-voltage memory unit 101.

$$i^* = \sqrt{(id^*)^2 + (iq^*)^2} \quad (6)$$

In the second operation mode as will be described later, the aforementioned $i^*$ is calculated by Equation (6), in a case in which values of $i_d^*$ and $i_q^*$ are individually set and the motor control is performed, and a value corresponding to the calculated one is called from the map. And then, as illustrated in FIG. 3, the map's value stored in this memory unit is inputted into the dead-time disturbance-voltage compensation unit 11, which is so arranged that a new voltage instruction-value $[v^*_{Td}]$ with respect to the $i^*$ can be determined, so that this operation mode ends its operations, and the operations transfer to those in the second operation mode.

Hereinafter, the explanation will be made for a principle of Equation (5).

Now, in the dead-time disturbance-voltage compensation unit 11, the dead-time disturbance-voltage compensation based on Equation (2) is performed; however, as already described above, a dead-time disturbance compensation-voltage amplitude $V_{Td}$ used in Equation (2) has an error $\Delta V_{Td}$ originated from a delay(s) of switching devices or the like of the electric power converter, and thus, it is necessary to modify the $V_{Td}$ by the quantity of the error.

Here, because the term $[i_{dq}]$ in Equation (4) contains a drive current $[i^*_M]$ based on a voltage instruction-value, and a disturbance current $[i^*_{Td}]$ generated due to the dead-time disturbance voltage, it can be said that an induced-voltage estimate value vector $[e_{dq}]$ contains an error voltage(s) due to the $[i^*_{Td}]$.

By the way, when attention is only paid to a fundamental wave component of induced voltage, an induced voltage on the d-axis becomes "0," so that, by subtracting a fundamental wave component of induced voltage on the d-axis, "0," from a fundamental wave component $e_d$ bar of a d-axis induced-voltage estimate value $e_d$, the estimation error of a fundamental wave component of the induced-voltage estimation value due to the $[i^*_{Td}]$ can be obtained.

Meanwhile, in Embodiment 1, the current control is performed in such a manner that d-axis electric current instruction-values $i_d^*$ are set at arbitrary constant values, and the q-axis electric current instruction-value $i_q^*$ is set at "0." In these cases, consideration will be given to an influence of a dead-time disturbance voltage appearing on the d-q axes. This is because, due to a three-phase/d-q conversion of $[v_{Td}]$ in Equation (1), it can be understood that, as shown in FIG. 6, disturbance in the shape of half-waves (refer to the curve indicated by the symbol "S" in the figure) appears on the energization axis, whereas disturbance in the shape of sawtooth waveforms (refer to the line indicated by the symbol "T" in the figure) appears on the non-energization axis.

Figure 6:
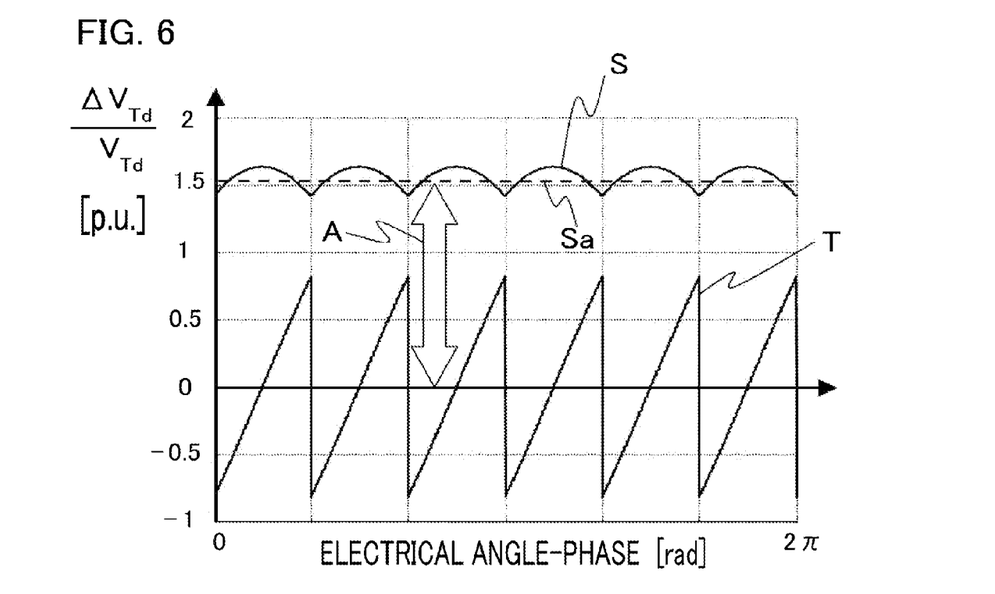
FIG. 6 is a diagram for explaining an operation principle of the memory means in a first operation mode according to a motor control device of the present invention.

Here, FIG. 6 is a graph showing an influence of $\Delta V_{Td}$ viewed on the d-q axes in a case in which $\Delta V_{Td} = V_{Td}$; the vertical axis indicates a value of $\Delta V_{Td}/V_{Td}$ shown by the unit of p.u. which is normalized power, and the horizontal axis, an electrical angle-phase shown by the unit of radian (rad). The curve indicated by the symbol "S" in the figure shows an error voltage (in the shape of half-waves) on the energization axis, and the broken line indicated by the symbol "Sa" shows a mean value (unit: p.u.) of this error voltage. In addition, the line indicated by the symbol "T" shows an error voltage at the time of non-energization, and is the shape of sawtooth waveforms.

Accordingly, from FIG. 6, it can be understood that, when only an error of fundamental wave component (refer to the arrow "A" in the figure) is considered, the influence appears only on the axis undergoing energization. When direct-current values of the error voltage in the shape of half-waves in FIG. 6 is calculated in a simple manner, the value of half-wave bosses in FIG. 6 is given by Equation (7), and the value of recesses therein is given by Equation (8) as shown below.

$$2\sqrt{2/3}\sin(\pi/2) \quad (7)$$

$$2\sqrt{2/3}\sin(\pi/3) \quad (8)$$

Accordingly, by taking on a value between $\pi/2$ and $\pi/3$ in the electrical angle-phases (taking on the arithmetic mean), $(\pi/2 + \pi/3)/2 = 5\pi/12$; and therefore, an acquired current value is given as follows:

$$2\sqrt{2/3}\sin(5\pi/12) \quad (9)$$

(refer to the straight line "Sa" in the figure that is a mean value of the error voltage).

Therefore, the following Equation (10) is held between the error voltage paid attention only to a fundamental wave component of an estimated induced voltage and a dead-time disturbance compensation-voltage amplitude error $\Delta V_{Td}$ as a three-phase rectangular wave.

$$2\sqrt{\frac{2}{3}}\sin\left(\frac{5\pi}{12}\right) \times \Delta V_{Td} = (e_{d\_\text{bar}} - 0) \quad (10)$$

From this Equation (10), Equation (5) is derived.

Next, the explanation will be made for the operations of the torque-ripple suppression control mode that is the second operation mode.

This mode is one of application examples on technologies for estimating a mechanical state-value; the mode allows curbing the torque ripple based on an estimation value of motor's torque.

In FIG. 4, the motor control device newly includes an adder 13 and a torque-ripple compensation unit 200 in comparison with the first operation mode, and the torque-ripple compensation unit 200 includes the induced-voltage estimation unit 10 and a torque-ripple compensation instruction generation unit 201.

In this operation mode, d-axis and q-axis electric current instruction-values $i_d^*$ and $i_q^*$ are inputted into the dead-time disturbance compensation-voltage memory unit 101, and $\Delta V_{Td}$ corresponding to those is inputted into the dead-time disturbance-voltage compensation unit 11. And then, in the dead-time disturbance-voltage compensation unit 11, a dead-time disturbance compensation-voltage $v^*_{Td}$ in which a dead-time disturbance compensation-voltage amplitude $V_{Td}$ is modified using the following Equation (11) in place of Equation (2) is generated and outputted into the adder 12, so that the dead-time disturbance compensation is performed.

$$[v_{Td}{}^*] = \text{sgn}[i] \times (V_{Td} + \Delta V_{Td}) \quad (11)$$

Next, the explanation will be made for the operations of a torque-ripple suppression control in this operation mode, namely, the operations of the torque-ripple compensation unit 200.

In the induced-voltage estimation unit 10, similarly to the first operation mode, an induced-voltage estimate value vector $[e_{dq}]$ is calculated, and is inputted into the torque-ripple compensation instruction generation unit 201. In the torque-ripple compensation instruction generation unit 201, motor's torque $\tau$ is estimated according to the following Equation (12), based on the induced-voltage estimate value vector $[e_{dq}]$ and a d-axis and q-axis detection-current vector $[i_{dq}]$.

$$\tau = \frac{[i^T_{dq}][e_{dq}]}{\omega_{rm}} \quad (12)$$

Here, $[i^T_{dq}]$ designates transpose of the vector $[i_{dq}]$.

And then, a vibration component contained in a torque estimation value $\tau$ is extracted; a torque-ripple compensation signal $i_q{}^*_{rip}$ is calculated so as to cancel out the vibration, and is inputted into the adder 13. Note that, there are many publicly known technologies in relation to a generation method of the torque-ripple compensation signal $i_q{}^*_{rip}$ based on this torque estimation value $\tau$; however, in the present invention, it is possible to use an arbitrary technology publicly known.

The adder 13 adds the torque-ripple compensation signal $i_q{}^*_{rip}$ to a q-axis electric current instruction-value $i_q{}^*$, and the value is inputted into the subtracter 6 as a new q-axis electric current instruction-value. According to this arrangement, it can be said that, in the motor 9, a pulsation torque based on the torque-ripple compensation signal $i_q{}^*_{rip}$ is produced, in addition to the torque due to the q-axis electric current instruction-value $i_q{}^*$ (namely, torque instruction $\tau^*$), in a reverse phase to a torque ripple, and it can be said that the torque ripple is curbed because the pulsation torque and the torque ripple are canceled out with each other.

The induced-voltage estimate value vector $[e_{dq}]$ and estimation torque calculated from Equation (4) based on the induced-voltage estimate value vector contain vibration components synchronized with a torque ripple; however, a 6f-component being a principal of them results in the superposition of a component originated from a dead-time disturbance voltage and a component where the motor itself generates, so that it is difficult to extract only the component (s) that the motor itself generates.

However, in this embodiment, the dead-time disturbance compensation is put to work using a dead-time disturbance-voltage compensation value stored at the time of the operations in the first operation mode, so that the 6f-component originated from the dead-time disturbance voltage is canceled out, and thus, it becomes possible to only extract the 6f-component where the motor itself generates.

In addition, when a dead-time disturbance compensation-voltage amplitude error $\Delta V_{Td}$ is to be acquired in the first operation mode, the operations can be performed without producing torque by the motor 9, because the d-axis only undergoes energization.

In addition, in the second operation mode, the induced-voltage estimation unit 10 is not engaged in the dead-time disturbance-voltage compensation operations, and thus, the dead-time disturbance compensation operations do not necessarily interfere with the torque-ripple suppression control.

Figure 7:
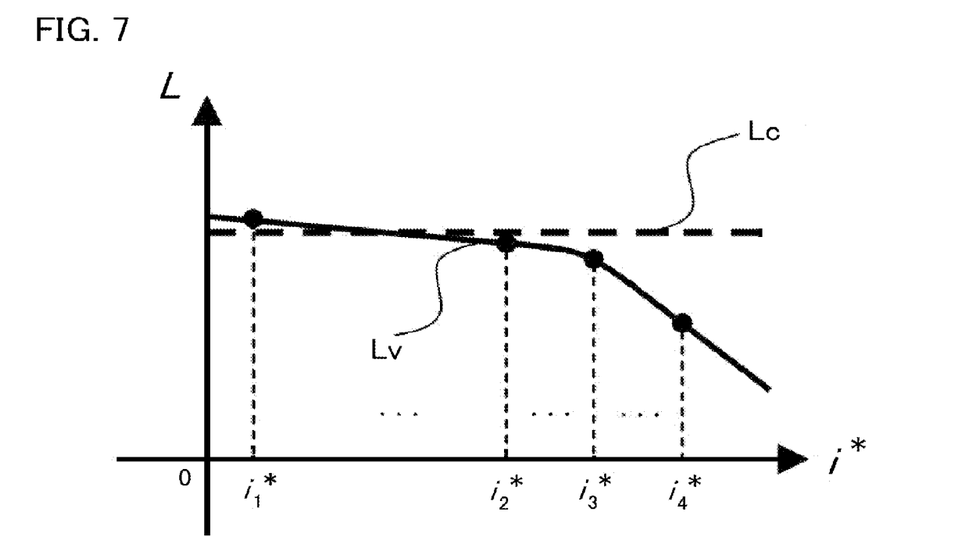
FIG. 7 is a diagram showing an example of characteristics of an inductance L that is a motor constant, with respect to an instruction-current amplitude value.

Moreover, as shown for example in FIG. 7, when dependency characteristics of inductance "L" being a motor constant with respect to an electric current (refer to the solid line indicated by the symbol "Lv" in the figure; the broken line "Lc" indicates the characteristics where inductance "L" has no dependence on the electric current) are known, it is also possible to achieve that, in conjunction with setting $i_d{}^*$ and $i_q{}^*$ by an operation pattern for acquiring dead-time disturbance compensation-voltage, and also setting a value of inductance "L" with respect to an electric current amplitude instruction-value $i^*$ made of $i_d{}^*$ and $i_q{}^*$ to that of inductance "Lv" in the induced-voltage estimation unit 10, the performance is enhanced without allowing the influence of disturbance originated from motor's parameter variation.

As described above, in this embodiment, by executing each of the sequences reaching from the first operation mode to the second operation mode one after another, an effect can be achieved that, based on observations of electrical state-values, the dead-time disturbance compensation can be easily performed, and there exists an effect in addition that, based on the observations of electrical state-values, the dead-time disturbance compensation and estimation of a mechanical state-value can be executed without interfering with each other.

Embodiment 2

This embodiment includes two operation modes, similarly to Embodiment 1: the dead-time disturbance compensation-voltage adjustment mode illustrated in FIG. 2 and FIG. 3 as a first operation mode, and a mechanical state-value estimation mode illustrated in FIG. 4 as a second operation mode. And then, a sequence is included in which, first the operations are performed as a dead-time disturbance compensation-quantity memory mode, and subsequently, the operations transfer to the mechanical state-value estimation mode.

As the mechanical state-value estimation mode, the exemplary explanation will be made for a device which includes a torque-ripple suppression control mode in which motor's torque is estimated, and a torque ripple is curbed based on the estimated torque.

In Embodiment 2, in the dead-time disturbance compensation-voltage adjustment mode, an operation pattern for acquiring dead-time disturbance compensation-voltage is set to have three features (d), (e) and (f) different from those in Embodiment 1, as follows:

(d) To the motor 9, its speed is given not at 0, but at a rotational velocity $\omega_{td}$ or more, so that it is rotating;
(e) the d-axis electric current instruction-value $i_d{}^*$ is set at 0; and
(f) a plurality of values are set as q-axis electric current instruction-values $i_q{}^*$, and, in each of $i_q{}^*$, the operations of this operation mode are performed through repetition thereof.

As described above, it can be said that the operations are performed mainly based on the energization on the q-axis. In the induced-voltage estimation unit 10, an induced-voltage estimate value vector $[e_{dq}]$ is calculated in accordance with Equation (4), and is inputted into the dead-time disturbance compensation-voltage memory unit 101.

Here, in the dead-time disturbance compensation-voltage memory unit 101, the calculation of the following Equation (13) is performed, in place of Equation (5), for a fundamental wave component $\bar{e}_q$ of a q-axis induced-voltage estimate value $e_q$ in the $[e_{dq}]$.

$$\Delta V_{Td} = \frac{e_{q\_}\text{bar} - \omega_{re}\phi_f}{2\sqrt{\frac{2}{3}}\sin\left(\frac{5\pi}{12}\right)} \quad (13)$$

The operations described above are repeated in each of the cases for a plurality of $i_q^*$, and a dead-time disturbance compensation-voltage amplitude error $\Delta V_{Td}$ is calculated by Equation (13) in all the cases. And then, by using an arbitrary approximation method of a linear interpolation or the like, a map of $\Delta V_{Td}$ is made with respect to an electric current amplitude instruction-value i* made of $i_d^*$ and $i_q^*$, and is stored in the memory unit, so that this operation mode ends its operations, and the operations transfer to those in the second operation mode.

Here, as for a principle of Equation (13), it is basically similar to the case of Equation (5). Namely, because the current control is performed in such a manner that q-axis electric current instruction-values $i_q^*$ are set at arbitrary constant values, and the d-axis electric current instruction-value $i_d^*$ is set at "0," it can be said that an estimation error of a fundamental wave component of an induced-voltage estimation value only appears on a q-axis component in the $[e_{dq}]$.

Meanwhile, when attention is only paid to a fundamental wave component of induced voltage, an induced voltage on the q-axis is given as $\omega_{re}\phi_f$ from magnet's magnetic flux $\phi_f$ and an electrical angular velocity $\omega_{re}$, so that, by subtracting a fundamental wave component ($\omega_{re}\phi_f$) of the induced voltage on the q-axis from a fundamental wave component $e_{q\_}$ bar of a q-axis induced-voltage estimate value $e_q$, the estimation error of a fundamental wave component of the induced-voltage estimation value can be obtained.

Therefore, in this embodiment, the following equation is held between the error voltage paid attention only to a fundamental wave component of an estimated induced voltage and a dead-time disturbance compensation-voltage amplitude error $\Delta V_{Td}$ as a three-phase rectangular wave.

$$2\sqrt{\frac{2}{3}}\sin\left(\frac{5\pi}{12}\right) \times \Delta V_{Td} = e_{q\_}\text{bar} - \omega_{re}\phi_f \quad (14)$$

From Equation (14), Equation (13) is derived. In addition, in regard to the torque-ripple suppression control mode that is the second operation mode, the operations equivalent or similar to those in Embodiment 1 are performed.

Moreover, as shown for example in FIG. 7, when known are dependency characteristics of inductance "L" being a motor constant with respect to an electric current (refer to the solid line indicated by the symbol "Lv" in the figure), it is also possible to achieve that, in conjunction with setting $i_d^*$ and $i_q^*$ by the operation pattern for acquiring dead-time disturbance compensation-voltage, and also setting a value of inductance with respect to an electric current amplitude instruction-value i*, made of $i_d^*$ and $i_q^*$, to that of inductance "Lv" in the induced-voltage estimation unit 10 and the dead-time disturbance compensation-voltage memory unit 101, the performance is enhanced without allowing the influence of disturbance originated from motor's parameter variation.

Figure 8:
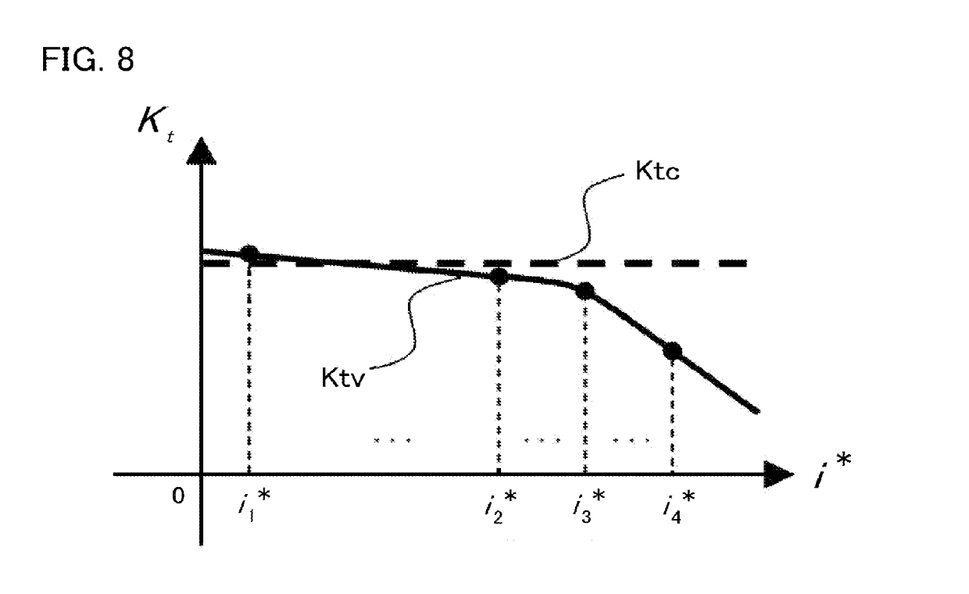
FIG. 8 is a diagram showing an example of characteristics of a torque constant $K_t$ that is a motor constant, with respect to an instruction-current amplitude value.

While on the other hand, with respect to an electric current amplitude instruction-value i* made of $i_d^*$ and $i_q^*$, and with respect to a motor having a property inwhich its torque becomes saturated, when known are saturation characteristics of the torque with respect to the electric current (refer to the solid line indicated by the symbol "Ktv" in FIG. 8; the broken line "Ktc" indicates the characteristics where a torque constant "$K_t$" has no dependence on the electric current), it is possible to show the saturation characteristics, in the form shown in FIG. 8, as a saturation curve Ktv of the torque constant $K_t$ with respect to the electric current amplitude instruction-value i*. Because magnet's magnetic flux $\phi_f = K_t/P_m$, as made known in Equation (3), it is also possible to achieve that, by using for the $\phi_f$ in Equation (13) a $\phi_f$ with respect to an individual electric current amplitude instruction-value i* obtained from the saturation curve Ktv of the torque constant $K_t$ shown in FIG. 8 as $\phi_f = K_t/P_m$, the performance is enhanced without allowing the influence of disturbance originated from motor's parameter variation.

As described above, in this embodiment, by executing each of the sequences reaching from the first operation mode to the second operation mode one after another similarly to Embodiment 1, an effect can be achieved that, based on observations of electrical state-values, the dead-time disturbance compensation can be easily performed, and there exists an effect in addition that, based on the observations of electrical state-values, the dead-time disturbance compensation and estimation of a mechanical state-value can be executed without interfering with each other. Note that, in the present invention, each of the embodiments can be freely combined, and/or each of the embodiments can be appropriately modified or eliminated without departing from the scope of the invention.

EXPLANATION OF NUMERALS AND SYMBOLS

Numeral "1" designates an electric current control unit; "2," d-q/three-phase conversion unit; "3," three-phase/d-q conversion unit; "4," electric power converter; "5," electric current detection unit; "6," "7," subtracter; "8," rotational position detector; "9," PM motor (motor); "10," induced-voltage estimation unit; "11," dead-time disturbance-voltage compensation unit; "12," "13," adder; "100," dead-time disturbance compensation-voltage modification unit; "101," dead-time disturbance compensation-voltage memory unit; "200," torque-ripple compensation unit; and "201," torque-ripple compensation instruction generation unit.

What is claimed is:
1. A motor control device, comprising:
 a rotational position detector for detecting a rotational position of a motor;
 an electric current detection unit for detecting at least two phase currents among three phase currents applied to the motor;
 a coordinate conversion unit for mutually converting values of said three phase currents on predetermined coordinates, and values on d-q coordinates being coordinates on a rotating magnetic field of the motor;
 an electric current control unit for generating voltage instruction-values being control inputs of voltages, based on a difference between electric current instruction-values being control inputs for said three phase currents, and electric current feedback values being currents detected by the electric current detection unit and d-q coordinate-converted by the coordinate conversion unit;
 an electric power converter for generating, based on said voltage instruction-values, three-phase voltages being inputted through the electric current detection unit so that predetermined electric power is supplied to the motor;

an induced-voltage estimation unit for estimating, based on said voltage instruction-values and said electric current feedback values, an induced voltage of the motor;

a dead-time disturbance-voltage compensation unit for generating a dead-time disturbance compensation-voltage being a voltage to compensate disturbance, with respect to an output produced at the electric current detection unit, due to dead time which is a short-circuit prevention period of two switching devices provided in the electric power converter; and a dead-time disturbance compensation-voltage modification unit for modifying said dead-time disturbance compensation-voltage in accordance with said electric current instruction-values, and also having the induced-voltage estimation unit, and, based on a fundamental wave component of an induced voltage being estimated, a dead-time disturbance compensation-voltage memory unit for calculating an error of said dead-time disturbance compensation-voltage and for storing the error inside, wherein the motor control device comprises two operation modes of a dead-time disturbance compensation-voltage adjustment mode for setting said electric current instruction-values in accordance with an operation pattern of the motor in order to acquire said dead-time disturbance compensation-voltage, and a torque-ripple suppression control mode for estimating torque of the motor, and for curbing a torque ripple thereof based on the torque being estimated; and, after operations in the dead-time disturbance compensation-voltage adjustment mode are completed, the operations transfer to the torque-ripple suppression control mode.

2. The motor control device as set forth in claim 1, further comprising a torque-ripple compensation unit including the induced-voltage estimation unit, and a torque-ripple compensation instruction generation unit for curbing, in accordance with an induced voltage estimated in the induced-voltage estimation unit, a torque ripple in which the motor produces.

3. The motor control device as set forth in claim 2, wherein, in the dead-time disturbance compensation-voltage adjustment mode, the torque-ripple compensation instruction generation unit is in a resting state, and the dead-time disturbance compensation-voltage modification unit operates in a state in which an operation pattern of the motor is inputted so as to drive the motor in accordance with the operation pattern, so that, in the dead-time disturbance compensation-voltage memory unit, a dead-time disturbance compensation-voltage compensation map corresponding to said electric current instruction-values is made based on an error of a dead-time disturbance compensation-voltage being calculated, and stored; and, in the torque-ripple suppression control mode, a dead-time disturbance compensation-voltage amplitude error corresponding to said electric current instruction-values stored in the dead-time disturbance compensation-voltage adjustment mode is outputted from the dead-time disturbance compensation-voltage memory unit, and inputted into the dead-time disturbance-voltage compensation unit, so that, in a state in which a dead-time disturbance voltage is compensated in accordance with a dead-time disturbance compensation-voltage being modified, the torque-ripple compensation instruction generation unit operates, and performs a torque-ripple suppression control.

4. The motor control device as set forth in claim 1, wherein, in an operation pattern of the motor, speed of not at zero, but of a constant value or more is given to the motor, while a q-axis electric current instruction-value thereof being set at zero to undergo non-energization, and a plurality of electric current instruction-values is set as a d-axis electric current instruction-value.

5. The motor control device as set forth in claim 1, wherein, in an operation pattern of the motor, speed of not at zero, but of a constant value or more is given to the motor, while a d-axis electric current instruction-value thereof being set at zero to undergo non-energization, and a plurality of electric current instruction-values is set as a q-axis electric current instruction-value.

6. The motor control device as set forth in claim 1, wherein a calculator of said dead-time disturbance compensation-voltage calculates a dead-time disturbance-voltage compensation value as an amplitude value for three-phase voltages.

7. The motor control device as set forth in claim 1, wherein, in the dead-time disturbance compensation-voltage adjustment mode, a dead-time disturbance compensation-voltage amplitude error $\Delta V_{Td}$ is calculated by a first equation (5)

$$\Delta V_{Td} = \frac{e_{q\_}\text{bar}}{2\sqrt{\frac{2}{3}} \sin\left(\frac{5\pi}{12}\right)} \quad (5)$$

when only a d-axis current undergoes energization, where $e_{d\_}$bar designates a fundamental wave component of a d-axis induced-voltage estimate value $e_d$ of the motor, and, by a second equation (13)

$$\Delta V_{Td} = \frac{e_{q\_}\text{bar} - \omega_{re}\phi_f}{2\sqrt{\frac{2}{3}} \sin\left(\frac{5\pi}{12}\right)} \quad (13)$$

when only a q-axis current undergoes energization, where $e_{q\_}$bar designates a fundamental wave component of a q-axis induced-voltage estimate value $e_q$ of the motor; $\phi_f$, magnet's magnetic flux; and $\omega_{re}$, electrical angular velocity.

8. The motor control device as set forth in claim 1, wherein the induced-voltage estimation unit changes inductance for the motor or a induced voltage constant, a torque constant, therefor depending on said electric current instruction-values.

* * * * *